United States Patent [19]
Riley et al.

[11] 4,221,419
[45] Sep. 9, 1980

[54] GRIPPING DEVICES

[75] Inventors: Keith Riley, 1, Snell Grove; Kenneth A. Riley, 1, The Castle, Castle Road, both of Colne, Lancashire, England; Gerrard J. Stoney, Preston, England

[73] Assignees: Keith Riley; Kenneth Alan Riley, both of Colne, England

[21] Appl. No.: 877,971

[22] Filed: Feb. 15, 1978

[30] Foreign Application Priority Data

Feb. 19, 1977 [GB] United Kingdom ............... 7093/77

[51] Int. Cl.² .............................................. B66C 1/64
[52] U.S. Cl. ..................................... 294/106; 294/85
[58] Field of Search ............... 294/85, 86 R, 90, 101, 294/106, 118, DIG. 1, DIG. 2; 24/243 B, 248 SA; 248/72, 226.2, 228, 316 R, 316 B; 269/240, 242, 249, 250, 251, 258, 264

[56] References Cited
U.S. PATENT DOCUMENTS

| | | | |
|---|---|---|---|
| 1,128,277 | 2/1915 | Adler | 294/118 |
| 2,901,012 | 8/1959 | Crispin | 24/248 SA X |
| 2,958,557 | 11/1960 | Cianchette | 294/106 |
| 3,606,441 | 9/1971 | Ridgely | 294/DIG. 1 X |

FOREIGN PATENT DOCUMENTS 1397075  6/1975  United Kingdom ................... 248/228

Primary Examiner—Johnny D. Cherry
Attorney, Agent, or Firm—Norris & Bateman

[57] ABSTRACT

A device for use in gripping a flanged structural member comprises a pair of gripping members pivotally connected together about a first axis for movement towards and away from one another, a screw threaded connection operable to urge the gripping members together to clamp a flanged member therebetween, and each of the gripping members being provided with a jaw having a recess to receive a flange of the flanged structural member, each jaw being pivotable about an axis parallel to the first axis.

3 Claims, 3 Drawing Figures

GRIPPING DEVICES

The invention relates to gripping devices and particularly to devices for use in gripping flanged structural members such as I-section girders.

The invention provides a device for use in gripping a flanged structural member, the device comprising a pair of gripping members pivotally connected together about a first axis for movement towards and away from one another, means operable to urge the gripping members together to clamp a flanged member therebetween, and each of the gripping members being provided with a jaw having a recess to receive a flange of the flanged structural member, each jaw being pivotable about an axis parallel to the said first axis.

Preferably each jaw is mounted for rotation on its associated gripping member.

Each jaw may comprise a cylindrical member having a slot to receive a flange. The jaw may be mounted for rotation in a part cylindrical channel in the associated gripping member. The channel may comprise a cylindrical tube in which the cylindrical member is a sliding fit, part of the tube being cut away along the length of the tube to allow access to the slot in the cylindrical member.

A stop member is preferably provided at each end of the channel to prevent the cylindrical means from sliding longitudinally out of the channel.

The means operable to urge the gripping members together may comprise a member interconnecting the pair of gripping members. The member may comprise a rotatable rod, the rod having a first threaded portion which co-operates with a threaded recess in one of the gripping members and a second threaded portion of opposite hand to the first threaded portion which co-operates with a threaded recess in the other gripping member.

Preferably the two gripping members are pivotally connected to means for connecting the device to a hoisting mechanism such as crane. The connecting means may comprise a member on which the two gripping members are pivotally mounted, the member carrying a shackle which is mounted on the member for pivotal movement about an axis which is perpendicular to the said first axis.

By way of example, specific embodiments of the invention will now be described, with reference to the accompanying drawings, in which.

Figure 1:
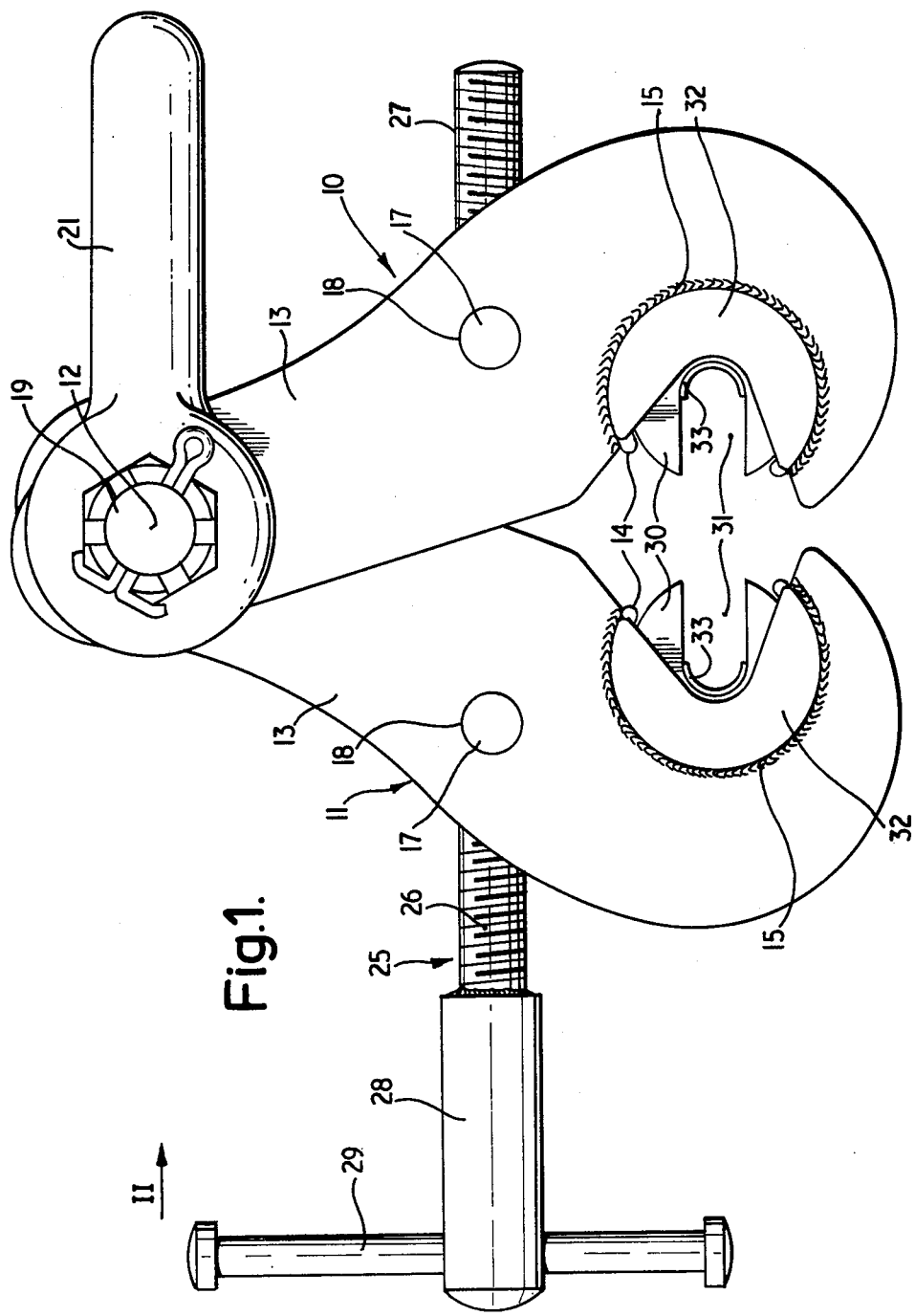
FIG. 1 is a side view of one embodiment of gripping device according to the invention.
Figure 2:
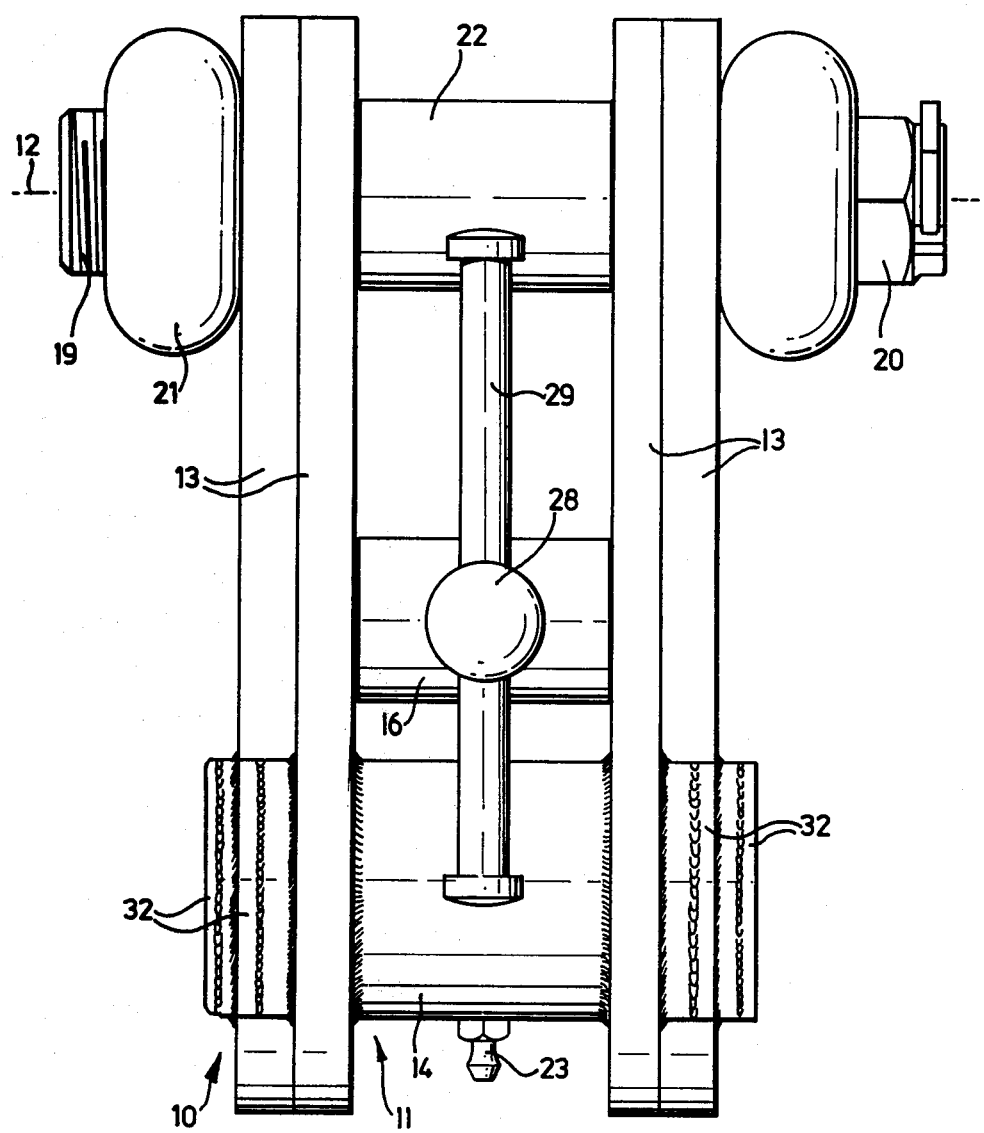
FIG. 2 is a view in the direction of arrow II of FIG. 1.

The device shown in FIGS. 1 and 2 of the drawings comprise a pair of gripping members 10 and 11 pivotally connected together about an axis 12 for movement towards and away from one another. Each gripping member comprises a pair of levers 13 inter-connected by a length of cylindrical tubing 14 welded therebetween. As best shown in FIG. 1, each lever 13 has a part circular portion 15 cut out therefrom and an end of one of the pieces of tubing 14 is welded into the portion 15.

A cylindrical member 16 is held captive between each pair of levers 13. Each member 16 has a short stub axle 17 projecting at each end thereof, and this stub axle is received in a hole 18 in one of the levers 13 so that the member 16 is freely rotatable between the two levers 13.

The two gripping members 10 and 11 are pivotally connected together by a bolt 19 which passes through all four levers 13 and is secured by a nut 20. The bolt also passes through a U-shaped shackle 21 and a collar 22. The collar 22 lies between the levers 13 of the gripping member 11. The arms of the shackle lie one on each side of the gripping member 10 and the shackle is rotatable about the axis 12.

A screw-threaded rod 25 passes through the two members 16. One portion 26 of the rod carries a right-hand thread and passes through a right-hand threaded bore in one of the members 16. The other end 27 of the rod carries a left-hand thread and passes through a left-hand threaded bore in the other member 16. A boss 28 is rigidly secured to one end of the rod 25 and a tommy bar 29 passes through this boss. Rotation of the rod 25 in one direction causes the two gripping members to move apart and rotation in the other direction causes the two gripping members to move together.

Slidably mounted within each of the portions of tubing 14 is a jaw comprising a length of cylindrical bar 30. Machined into each bar 30 is a longitudinally extending U-cross-section slot 31. Part of each portion of tubing 14 is cut away so that while each jaw 30 is still retained within the tubing, access is given to the slot 31. At each end of the tubing 14 a small fillet piece 32 is welded to the tubing so that while the ends of the slot 31 are not obstructed, the jaw 30 cannot slide longitudinally out of the tubing 14. Screw-threads 33 are provided at the base of each U-cross-section slot 31.

A grease nipple 23 is provided on each portion of tubing 14, so that the sliding face of each jaw can be greased when necessary.

If it is desired to use the gripping device to lift an I-section beam, the gripping members are opened and the device is arranged so that the jaws 30 lie one at each side of a flange of the beam. The rod 25 is then rotated to bring the gripping members together so that the jaws 30 closely embrace the flange and the beam is gripped tightly. A crane or other hoisting device can be connected to the lifting device using the shackle 21 and the beam can then be lifted. The screw-threads 33 assist the gripping action of the jaws.

If the jaws 30 were rigidly secured to the gripping members, then it would not be possible to make the jaws 30 mate securely with the flanges of both large beams and small beams. To ensure that a beam is gripped firmly and safely, it is important that the two slots in the jaws face one another. The fact that the jaws of the device according to the invention are rotatable makes it possible for the jaws to be correctly oriented regardless of the size of the beam. If the jaws were fixed, then as the gripping members 10 and 11 were pivoted, the orientation of one slot 31 would vary with respect to the other slot, and there would only be one position of the device in which the two slots 31 faced one another.

The gripping device can also be used as an anchorage point secured to a fixed member. For example the device can be clamped to a flanged girder with the shackle 21 hanging downwardly for use in attaching a rope, pulley, or other item.

Figure 3:
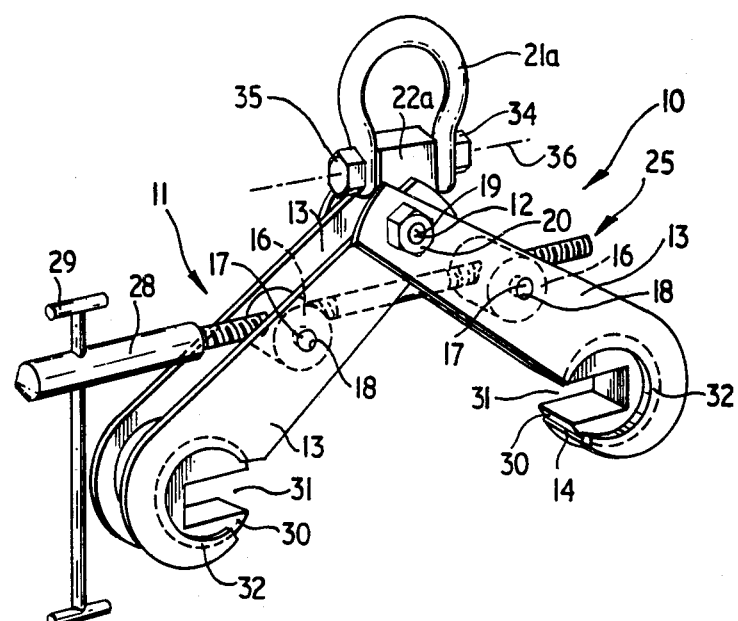
FIG. 3 is a perspective view of an alternative embodiment of device according to the invention.

FIG. 3 shows an alternative embodiment of gripping device which is similar to the gripping device shown in FIGS. 1 and 2, and like reference numerals have been used to denote like parts.

The slots 31 however are rectangular in cross-section and do not have threaded bases.

Instead of having a shackle 21 secured by the bolt 19, there is a rectangular block 22a mounted on the bolt 19 between the levers 13 of the gripping member 11, in place of the collar 22, and a shackle 21a is rotatably secured to the upper end of the block by a nut 34 and bolt 35. The shackle is thus pivotable about an axis 36 which is perpendicular to the axis 12, so that if the device is clamped to the flanges of an upright girder, the shackle can still be pivoted to hang downwardly for use in anchoring purposes.

The invention is not restricted to the details of the foregoing embodiments. For example the rod 25 may be replaced by a rod carrying a single hand thread, one end of the rod being secured against rotation to one of the members 16, the other end of the rod passing slidably through the other member 16, and a rotatable nut being threaded onto the free end of the rod.

We claim:

1. A device for use in gripping a flanged structural member, said device comprising:
   (a) a pair of gripping members pivotally connected together about a first single axis for movement towards and away from each other, each gripping member comprising:
      (i) a pair of spaced apart support members;
      (ii) a cylindrical tube parallel to said first axis interconnecting the pair of spaced apart support members;
      (iii) a cylindrical member which is a sliding fit in the cylindrical tube and can hence rotate therein about an axis parallel to said first axis;
      (iv) a radially extending slot in the cylindrical member shaped to receive a flange of the flanged member;
      (v) a cut-away portion in the cylindrical tube extending along the length of the tube to allow access to said slot in the cylindrical member; and
      (vi) a stop member means immovably affixed to each end of the tube for holding the cylindrical member captive and preventing the cylindrical member from sliding longitudinally out of the tube;
   and:
   (b) adjustable means operable to urge the gripping members together to clamp a flanged member therebetween with a flange of the flanged member received in the slot of the cylindrical member of each gripping member.

2. A gripping device as claimed in claim 1, in which the adjustable means comprises a rotatable rod, the rod having a first threaded portion which co-operates with a threaded recess in one of the gripping members and a second threaded portion of opposite hand to the first threaded portion which co-operates with a threaded recess in the other gripping member.

3. A gripping device as claimed in claim 1, comprising a supporting member on which the two gripping members are pivotally mounted, and means on the supporting member mounting a shackle for pivotal movement about an axis which is perpendicular to the said first axis.

* * * * *